UNITED STATES PATENT OFFICE.

WILHELM WEBER, OF STOLBERG II, GERMANY, ASSIGNOR TO CHEMISCHE FABRIK RHENANIA, OF AACHEN, GERMANY.

ASEPTIC PREPARATION FROM PANCREAS AND PROCESS OF PRODUCING SAME.

SPECIFICATION forming part of Letters Patent No. 691,681, dated January 21, 1902.

Application filed August 28, 1900. Serial No. 28,335. (Specimens.)

*To all whom it may concern:*

Be it known that I, WILHELM WEBER, a citizen of Germany, residing at Stolberg II, Rheinland, in the Empire of Germany, have invented a certain new and useful Aseptic Preparation from Pancreas and Process of Producing it, (for which application for a patent has been made in Germany, dated April 21, 1900, and in Great Britain, dated August 11, 1900, No. 14,413,) of which the following is a specification.

The juice expressed from the pancreas gland contains, besides the enzyms, which are the active constituents, a considerable proportion of albuminous compounds, which are not separated in the usual manufacture of dry preparations of the gland. The purification of the product from these matters is a somewhat-involved process and is generally attended by a large loss of enzym and frequently also by formation of decomposition products, due to action of bacteria, which adhere to the precipitate and render this useless for many purposes. The enzyms, generally speaking, are very sensitive to chemical agents, like strong acids, and are very easily decomposed thereby. By the discovery which forms the basis of this invention, however, it is shown that certain acids are exceptions to this statement and may serve for manufacturing pure or concentrated enzyms. Such acids are the organic acids sparingly soluble in water—such as salicylic acid, benzoic acid, and succinic acid—which can produce precipitates in extract of pancreas.

This invention therefore relates to the manufacture of preparations of pancreas by the aid of acids of the kind referred to, such preparations being active and free from any damage by bacteria. For this purpose the pancreas extract is mixed with common salt or another neutral salt and the organic acid. The precipitates obtained are insoluble in water, but are soluble in solutions containing alkali or alkali salts. The solutions thus obtained have the same digestive power that characterizes the fresh pancreas or the dried preparations. The yield is about ten to fifteen per cent. of the dried gland.

The preparations made according to this invention are particularly applicable to surgery because of their aseptic character.

The following examples illustrate the invention:

Example 1: One hundred grams of pancreatin are shaken with a liter of common-salt solution of ten-per-cent. strength, and the liquid is filtered. To the filtrate is added a concentrated alcoholic or aqueous-alcoholic solution of fifteen to twenty grams of salicylic acid or an equivalent quantity of another acid of the kind referred to, and the mixture is shaken. The precipitate is filtered off, washed with water, pressed, and, if necessary, purified by means of alcohol and ether. Instead of a solution of pancreatin fresh pancreas-juice may be used. By adding alkali or an alkaline salt to the moist or dry precipitate a soluble preparation is obtained.

Example 2: The aqueous solution obtained from one hundred grams of pancreatin in the manner described in Example 1 is made feebly alkaline, and in it are dissolved eighteen to twenty grams of sodium salicylate or the equivalent quantity of the sodium salt of one of the acids of the kind referred to. To the solution thus obtained is added a quantity of normal hydrochloric acid or other acid equivalent to the total alkali present. The precipitate formed is purified in the manner described in Example 1.

Having now particularly described the nature of my said invention and the best means I know of carrying the same into practical effect, I claim—

1. A process for obtaining an aseptic preparation from pancreas consisting in first making an aqueous solution containing pancreatin, feebly alkaline, then adding to this solution a salt of an organic acid sparingly soluble in water, then adding enough of a strong acid to produce a precipitate and finally washing this precipitate, substantially as described.

2. A composition of matter consisting of pancreatin, chemically combined with an organic acid sparingly soluble in water, and characterized by being insoluble in water, soluble in alkalies and aseptic.

In testimony whereof I have hereunto set my hand in presence of two subscribing witnesses.

WILHELM WEBER.

Witnesses:
  G. SCOTT,
  ARUDT.